Jan. 8, 1963  J. T. FRANKLIN  3,071,983
COMBINED GEAR AND HYDRAULIC TRANSMISSION ASSEMBLY
Filed Aug. 6, 1959  4 Sheets-Sheet 3
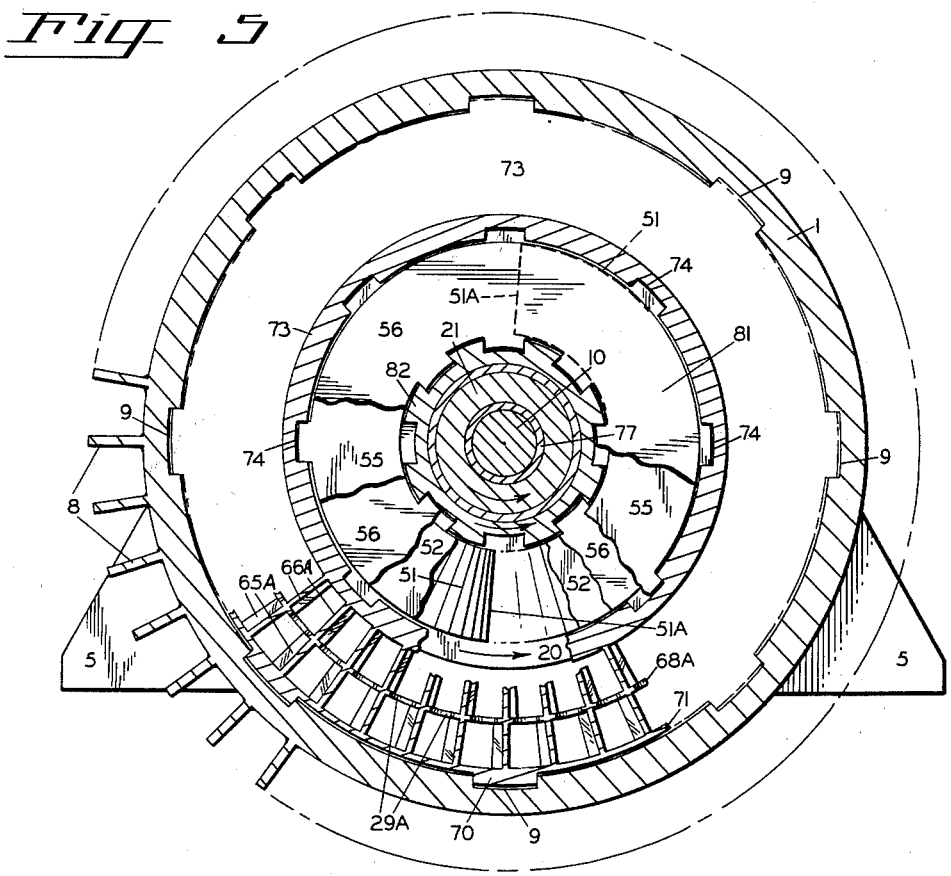
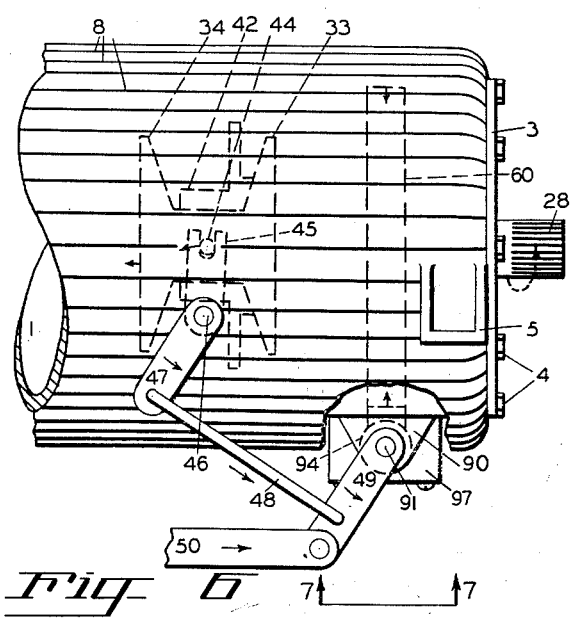
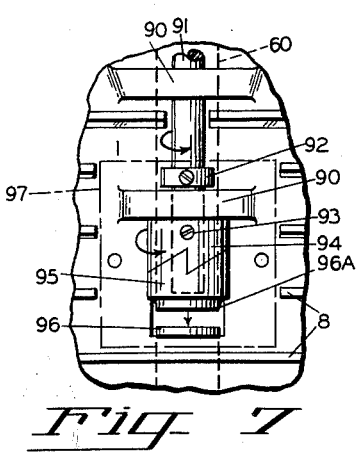
INVENTOR.
JOHN T. FRANKLIN

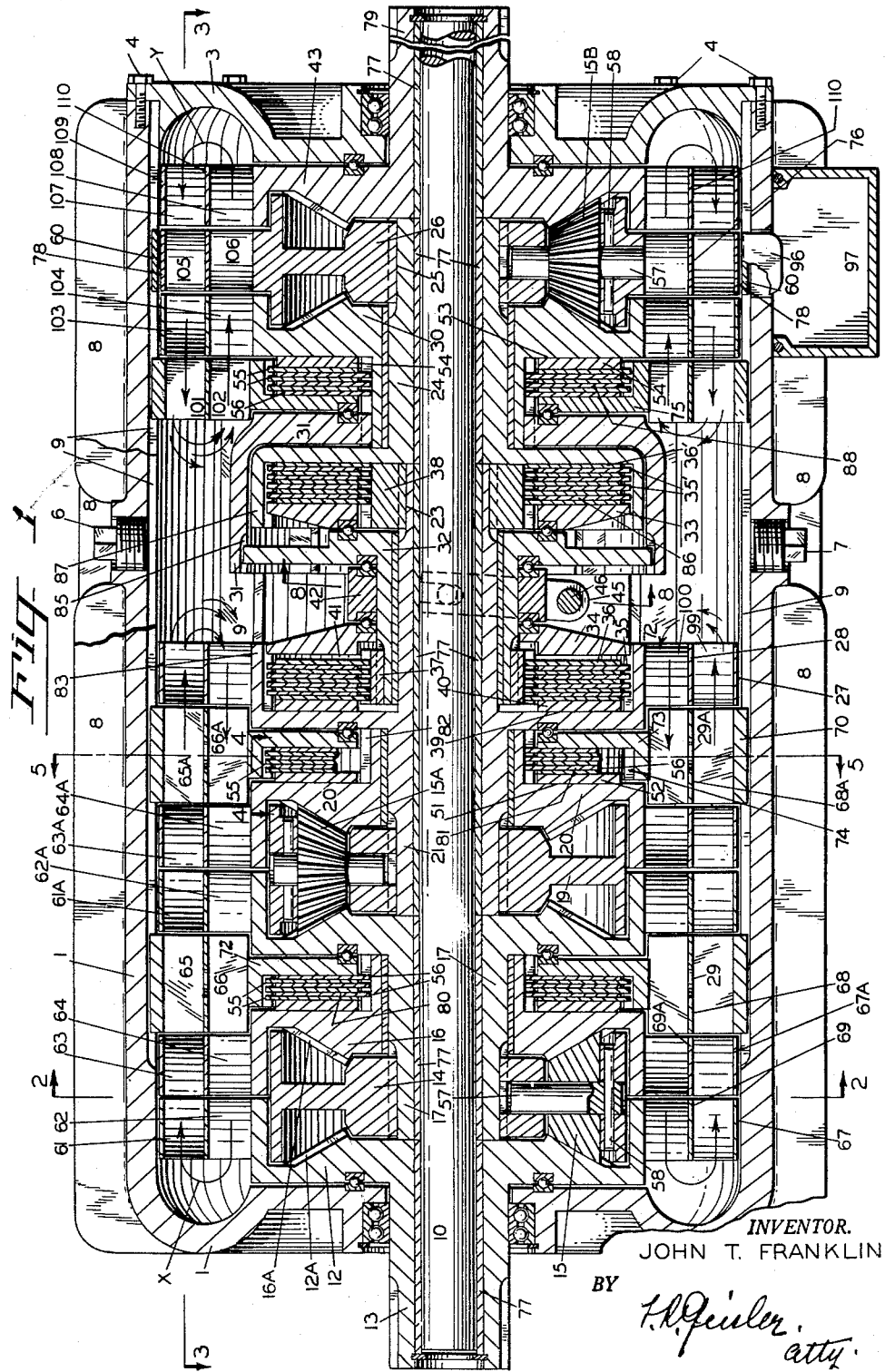

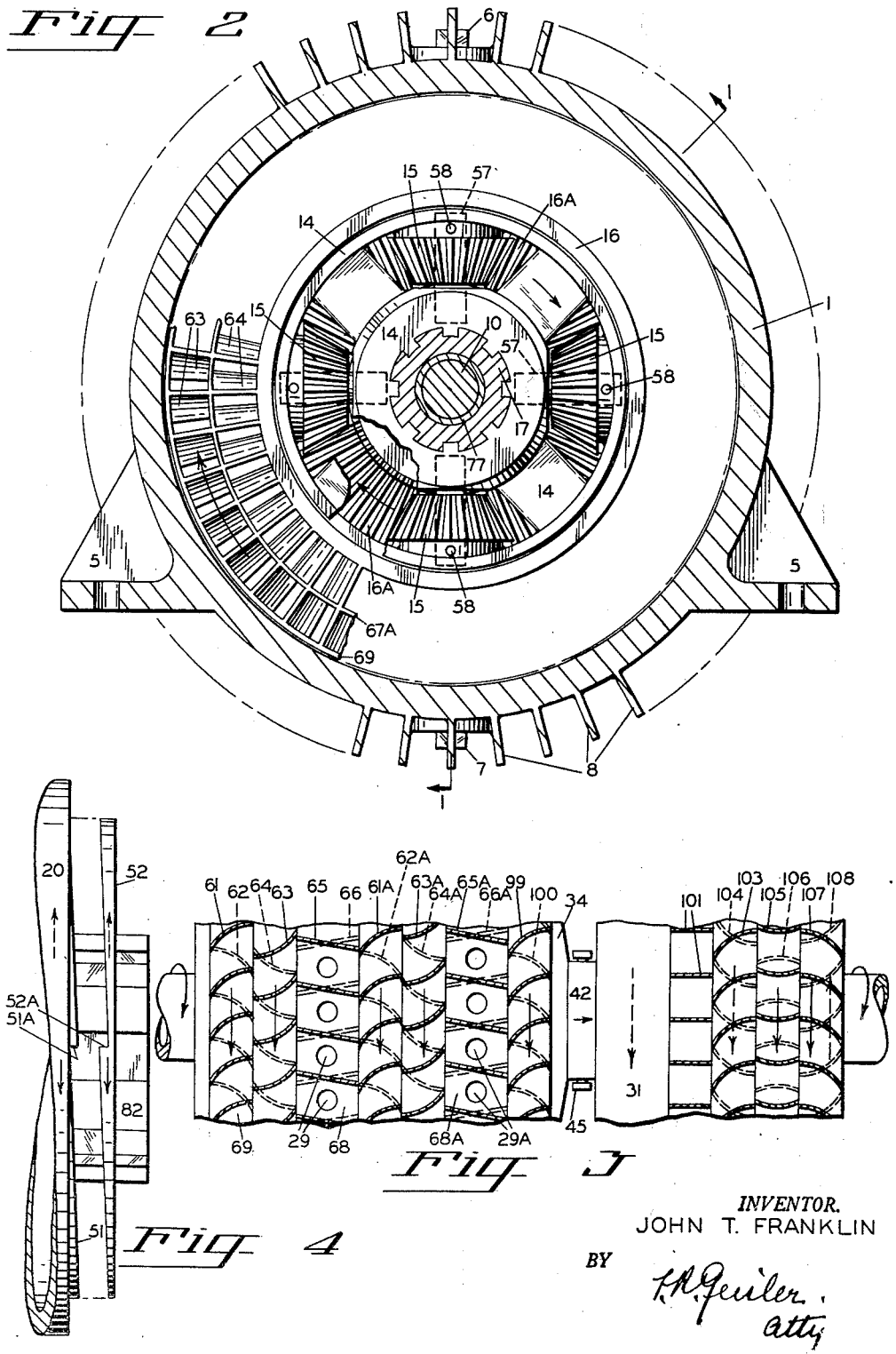

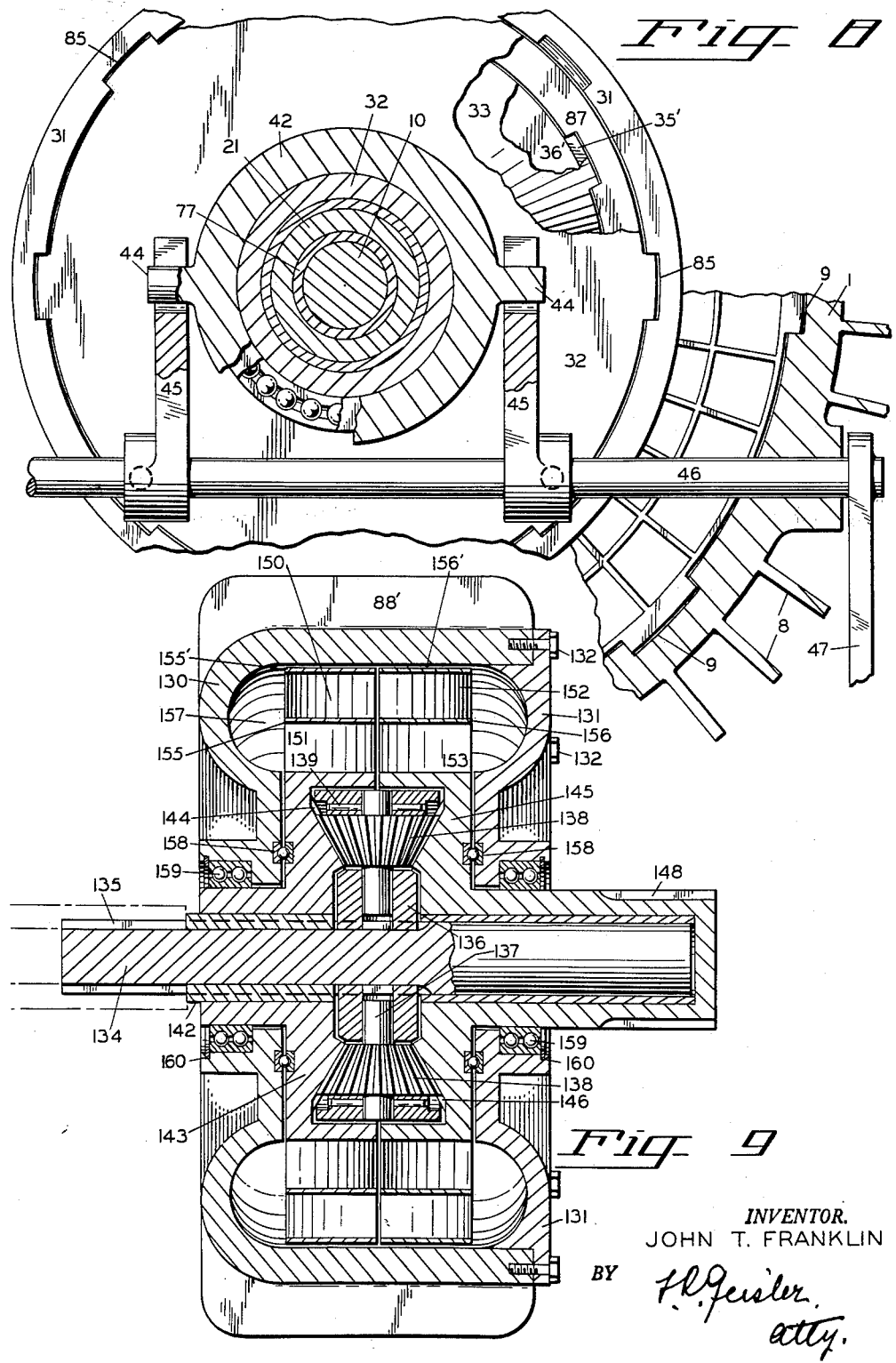

United States Patent Office 3,071,983
Patented Jan. 8, 1963

3,071,983
COMBINED GEAR AND HYDRAULIC
TRANSMISSION ASSEMBLY
John T. Franklin, 6802 SE. Overland, Portland, Oreg.
Filed Aug. 6, 1959, Ser. No. 832,105
4 Claims. (Cl. 74—688)

This invention relates to a transmission means for transmitting power from an input shaft to an output shaft at varying torque speeds and ratios.

An object of the invention is to provide an improved and efficient power transmitting assembly combining both mechanical, or gear driving means, and hydraulic driving means.

Another object of the invention is to provide an improved transmission assembly in which a smooth, uninterrupted output of power will be delivered to the output or driven shaft under all variations of speed of the input or driving shaft and under all operating conditions.

A further specific object of the invention is to provide a transmission assembly having a novel combination of mechanical and hydraulic drive means between input and output shafts in which power during heavy or starting load conditions will be transmitted substantially entirely by mechanical connecting means, but in which, as the load decreases and the speed increases, the hydraulic connecting means will automatically and gradually be substituted partly or entirely for the mechanical connecting means.

These objects and additional advantages are attained from a combination of gear and hydraulic transmission means as hereinafter described with reference to the accompanying drawings which illustrate a preferred form of the device.

In the drawings:

FIG. 1 is a longitudinal sectional view of the transmission assembly taken on the line 1—1 of FIG. 2;

FIG. 2 is a transverse sectional view taken on the line 2—2 of FIG. 1;

FIG. 3 is a fragmentary plan section illustrating the hydraulic drive means of the assembly, taken on the line 3—3 of FIG. 1;

FIG. 4 is a fragmentary elevational view of a cam structure comprising a part of one of the uni-directional clutch or brake assemblies and taken on line 4—4 of FIG. 1, but drawn to a larger scale;

FIG. 5 is a transverse sectional view taken on the line 5—5 of FIG. 1;

FIG. 6 is a fragmentary elevational view, drawn to a smaller scale, of the transmission housing showing operating linkage for controlling the direction of the power output;

FIG. 7 is a fragmentary plan view showing a portion of the operating control linkage, taken on the line 7—7 of FIG. 6 looking in the direction indicated by the arrows;

FIG. 8 is a fragmentary sectional view drawn to a larger scale, also showing operating control linkage, taken on the line 8—8 of FIG. 1; and FIG. 9 is a sectional elevation showing a modified and simplified form of the invention.

The assembly operates through a series of stages from low to high output speed, and correspondingly from high to low output power requirement, with a gradual increase in the employment of the hydraulic means. The mechanical transmission means will first be briefly described.

Referring first mainly to FIG. 1, the numeral 1 designates a housing and fluid reservoir for the entire transmission assembly, having an end plate 3 removably mounted on the housing by screws 4. The housing 1 has integral mounting brackets 5 (FIG. 2) for mounting it in a stationary, non-rotative position on the vehicle chassis, or other suitable base and has a filler plug 6 as well as a drain plug 7 for the hydraulic fluid. The exterior surface of the housing has radial blades or fins 8 to aid in reducing heat developed in the operation of the assembly, and the interior surface of the housing has spline grooves 9 (see also FIGS. 5 and 8) for locking various parts of the working mechanism in non-rotative position. As will be apparent, all the rotating parts of the device, as later described, are supported and concentrically aligned on a pilot shaft 10 which serves no function other than acting as an internal support shaft.

A driving bevel gear member 12 (FIG. 1) comprises part of an input shaft 13 which is adapted to be suitably connected to the driving motor (not shown). Gear 12 has a beveled tooth portion 12A and integrally carries on its peripheral edge outer and inner vanes 61 and 62, respectively, such vanes being shown more clearly in FIG. 3. The outer and inner sets of vanes 61 and 62 are defined peripherally by annular walls 67 and 69, respectively. These will be referred to later.

Bevel gear 12 is adapted to drive a carrier member 14 by means of a plurality of pinion gears 15 which mesh with teeth 12A and which are pivotally supported on carrier 14 by radial stub shafts 57 held in place by pins 58 in the periphery of carrier 14 parallel to the axis of carrier 14. As seen in FIG. 2, four pinions 15 are mounted on carrier 14 although it is to be understood that more or less pinions may be utilized. The carrier 14 is splined to a first main driven member 17. The driven member 17, as well as the input shaft 13 with its integral gear member, is rotatably mounted on the common pilot shaft 10 through the bushing 77.

The pinions 15 also mesh with a second gear member 16 having a beveled tooth portion 16A and mounted on the member 17 through a suitable bushing. The pinions 15 provide a mechanical drive connection between the driving gear member 12, the carrier 14 and therewith the member 17, and the gear member 16. Thus, if the gear member 16 is held against rotation in an opposite direction, the pinions 15 will drive the member 17, if there is a load on member 17, preferably, but not necessarily, with a two to one speed reduction.

The gear member 16 carries on its peripheral edge two sets of vanes comprising outer vanes 63 and inner vanes 64 (FIGS. 1, 2 and 3) which, similar to the vanes 61 and 62 on gear 12, are defined peripherally by annular walls 67A and 69A, respectively. These also will be referred to later.

The first driven member 17 has an integral gear (FIG. 1) with a beveled tooth portion meshing with a second set of pinions 15A pivotally mounted on a carrier 19. The second set of pinions 15A engage a third gear member 20 having a beveled tooth portion in mesh with the second set of pinions 15A. Carrier 19 is keyed to a second driven member 21. Thus if gear member 20 is held against rotation member 21 will be rotated at a further reduced speed. The gear of member 17 carries peripheral vanes 61A and 62A and gear member 20 carries peripheral vanes 63A and 64A, respectively, to be referred to later, these sets of vanes having peripheral defining walls. The gear member 20 is rotatably supported on the member 21 through a suitable bushing.

The gear member 16 is connected with a brake mechanism designated by the numeral 80 (FIG. 1) which is of such construction as automatically to allow the gear member 16 to rotate only in a forward direction, such forward direction being clockwise as viewed in FIG. 2. Similarly the fourth gear member 20 is connected with a brake mechanism 81 which allows gear member 20 to rotate only in the same forward direction. Since these brake mechanisms are similar it will suffice to describe one of them in detail, namely mechanism 81 with which gear member 20 is connected.

Bevel gear member 20 (FIG. 4) has a cam face 51, adapted to engage a freely floating cam ring 52, these cam elements having opposed engageable shoulder portions 51A and 52A. A flanged brake drum member 73 (FIGS. 1 and 5) has internal spline grooves 74 and has integral fluid guide vanes 65A and 66A on opposite sides of an annular separating wall 68A having a plurality of apertures 29A. Brake member 73 has a peripheral wall 71 which, as best seen in FIG. 5, is provided with splines 70 engageable with spline grooves 9 of housing 1, whereby the member 73 is supported in non-rotative position in the housing.

Disposed between the floating cam ring 52 (FIGS. 1 and 5) and the brake member 73 are a plurality of friction discs 55 connected to brake member 73 by means of spline grooves 74 and alternating friction discs 56 connected to gear member 20 by means of a spline hub 82 on the gear member 20.

The cam face 51 (FIG. 4) and the floating cam ring 52 are capable of fitting snugly together with the shoulders 51A and 52A engaged, whereby in such position of these parts, the friction faces of discs 55 and 56 are out of engagement and cam element 52 is free to rotate with gear 20. However, when cam ring 52 rotates slightly relative to gear 20 the shoulders 51A and 52A are moved apart and ring 52 is cammed to the right (referring to FIGS. 1 and 4), and causing the discs 55 and 56 to be pressed together and the brake to be engaged. In such engaged condition of the brake, gear member 20 is thus locked to stationary member 73 and cannot rotate in reverse. Similarly gear member 16 cannot rotate in reverse. Brake mechanism 80, similar to brake mechanism 81, includes a brake member 72, splined to the housing 1, having integral fluid guide vanes 65 and 66 and having friction discs and cam elements the same as in the brake mechanism 81. Guide vanes 65 and 66 are separated by a peripheral wall 68 (FIG. 3) having apertures 29.

Thus, with a load on the second driven member 21 and with gear members 16 and 20 held against opposite rotation, the member 21 will be driven by the driving shaft 13, through the intermediary of the mechanical means described, at much less speed and correspondingly greater power. The member 21 integrally carries peripheral impeller vanes 99 and 100 which are defined peripherally by annular walls 27 and 28 respectively, referred to later.

Driving power is transmitted from member 21 through either of two clutches 41 or 86 (FIG. 1) which are part of a reversing clutch mechanism. This reversing clutch mechanism is manually operated for reversing the direction of output power.

Second driven member 21 is operative to drive a third driven member 24 in the same forward direction through the clutch 86, referred to herein as the forward drive clutch. Member 21 has a spline connection 23 with a clutch plate supporting ring 38. Member 24 also has an integral, internally splined drum portion 87. Clutch 86 has multiple clutch discs 35' and 36' and these alternate discs engage splined portions respectively of the drum portion 87 of member 24 and of the ring 38.

The clutch 41 is the reverse drive clutch. Member 21 has a flange 83 with splines slidably engaged by peripherally splined clutch discs 35. These clutch discs 35 are adapted frictionally to engage peripherally splined clutch discs 36 which in turn have a spline connection with an externally splined sleeve 37. Sleeve 37 in turn is splined to a member 32. Member 32 is rotatably supported on member 21 through a suitable bushing and is also slidable to a limited extent. Member 32 is slidably splined at 85 to a drum member 31. Member 21 has a cam face 39 associated with a floating cam ring 40 and these cam elements have the same structure as cam elements 51 and 52 of FIG. 4, and therefore need not be described in detail.

These cam elements operate automatically to engage the clutch 41 under certain conditions, as will be explained presently.

Clutches 41 and 86 are manually engaged and disengaged by a control ring 42, FIGS. 1, 6 and 8. On one side (thus on the left as viewed in FIG. 1) the control ring 42 engages a plate 34 adapted to cause engagement of clutch 41. On the opposite side control ring 42 engages a plate 33 through the intermediary of slidable member 32. Relative rotation is provided between the control ring 42 and its engageable members by bearings, the entire unit, comprising the control ring and its engageable members, being slidable longitudinally in the assembly from one clutch engaging position to the other.

Control ring 42 has oppositely extending integral projections 44, best seen in FIG. 8, engageable by a pair of slotted levers 45 integrally mounted on a shaft 46 to which an arm 47 is secured. The arm 47 (FIG. 6) is connected through a link 48 to a lever 49 operated by a link 50 from a manual control mechanism (not shown).

In forward drive, with clutch 86 engaged and clutch 41 disengaged (FIG. 1), torque is transmitted from the second driven member 21 through clutch plate supporting ring 38 and clutch 86 to the third driven member 24 through the intermediary of its drum portion 87. Member 24 has a splined connection 25 with a carrier 26, similar to carriers 14 and 19, on which pinions 15B are rotatably carried which mesh with a bevel gear 30 and also with an opposed bevel gear 43 which forms a part of the driven or output shaft 79. The carrier 26 has integral peripheral vanes 105 and 106 defined by annular walls 76 and 78 and gear 43 has integral peripheral vanes 107 and 108 also defined by annular walls 109 and 110.

The carrier 26, being driven forwardly, has a tendency, through the pinions 15B to rotate gears 30 and 43 forwardly with it, but since the load is on the gear 43, gear 30 tends to dissipate the torque by rotation forward at greater velocity than the velocity of the carrier 26 or gear 43. This higher velocity of such gear 30 is fed back to the reverse clutch 41 through members 31, 32 and 37 and consequently to clutch discs 36 of said clutch. It will be seen that this increased velocity fed to clutch 41, and specifically to clutch discs 36 will cause the floating ring 40 to rotate faster than the associated cam face 39 on the drive member 21 to separate cam elements 39 and 40 and automatically engage reversing clutch 41. As clutch 41 thus prevents speeded up rotation of gear 30, because of its locking gear 30 with member 21, the two gears 30 and 43 are more or less locked together with their pinions 15B not rotating. Such locked condition exists at low speed and heavy load condition, but, as will be seen hereafter, overdrive means is provided in forward drive at higher speeds.

In reverse drive, with clutch 41 engaged and clutch 86 disengaged, member 21 drives member 32 through clutch 41, and member 32 drives drum member 31. Member 31 drives gear 30 to which it is splined. Gear 30 has peripheral vanes 103 and 104 referred to later.

Associated with gear carrier 26 is a motion arresting clutch or brake band 60 adapted, in the reverse drive with clutch 41 engaged, to grip the defining wall 78 of gear carrier 26 to hold the latter in a non-rotative position. The band 60 is disengaged from the wall 78 in the forward drive position and its engaging and disengaging functions are controlled by the lever 49 (FIG. 6), secured to the shaft 91 (see also FIG. 7). The shaft 91 is journaled in bearing members 90 and held against longitudinal movement by a collar 92. This shaft 91 carries a first cam element 94, secured thereto as by means of a set screw 93, and a second cam element 95 slidably mounted thereon and engageable with cam element 94. Clutch band 60 has one end 96 anchored to a housing 97 enclosing the cam elements and has its other end 96A secured to the cam element 95. It will thereby be seen that upon forward movement of the link 50 (FIG. 6) the cam shaft 91 will be rotated in the direction of the arrows in FIG. 7 to separate the cam elements and tighten the band 60 on gear carrier 26.

Thus, when the reverse clutch 41 is engaged the clutch band 60 is tightened to hold the carrier 26 against rotation. Under such condition the driving of gear 30 forwardly drives the pinions 15B which produce rotation of the gear 43, and therewith of the output 79, in the reverse direction.

It is to be understood that in all operational functions input member 13 is driven by the source of power in a clockwise direction as viewed in FIG. 2. For forward drive, which will be explained first, the control ring 42 (FIG. 1) is moved toward the right to cause engagement of clutch 86.

With carrier 14 connected to the load, gear 12 thereby tends to rotate gear 16 in a reverse direction through pinions 15 on carrier 14. However, reverse torque applied to gear 16 causes the cam elements of brake mechanism 80 to separate and such expansion results in the engagement of brake 80 to prevent reverse rotation of gear 16. A ratio drive is thus established, preferably an arrangement providing for a half speed reduction. Carrier 14 rotates the first main driven member 17. Member 17 rotates second main driven member 21 through the intermediary of pinions 15A and carrier 19.

Member 21 drives clutch plate supporting ring 38 of forward clutch 86. As the clutch 86 is engaged, torque is transmitted therethrough to the third main driven member 24 connected to gear carrier 26. This gear carrier in rotating forwardly has a tendency, through the connection by pinions 15B to rotate gears 30 and 43 forwardly with it, and, since the load is on the gear 43, gear 30 has a tendency to rotate forwardly at greater speed than carrier 26, but this is prevented, as previously explained, by the clutch 41.

The operation of the transmission so far described has been concerned only with the mechanical connection. Such mechanical connection comprises the sole driving power at starting speeds, but as the vehicle accelerates this mechanical connection is gradually and smoothly aided and finally supplanted by hydraulic drive means now to be described.

The peripheral portion of the main housing is filled with suitable hydraulic fluid. With the rotation of gear 12 its vanes 61, which comprise drive or impeller vanes, (FIGS. 1 and 3) exert a pumping action on the hydraulic fluid in the direction indicated by the curved arrow X in FIG. 1. As the speed of gear 12 increases, the speed of the pumped hydraulic fluid increases. The reaction of the fluid against the vanes 63 of gear 16, which comprise driven or turbine vanes, will tend to rotate gear 16 forwardly. Such hydraulic reaction is negligible at starting speed and is not effective to overcome the reverse torque on gear 16 which is applied by gear 12 through pinions 15. However, upon acceleration and decrease of the load the hydraulic drive increases and finally when certain speed and load conditions are reached the hydraulic reaction overcomes such reverse torque reaction to start forward rotation of gear 16. As the latter starts to rotate, the pinions 15 decrease in speed and consequently the gear ratio is decreased until finally when there is a complete hydraulic connection between the impeller and turbine vanes, the pinions 15 are stationary on their shafts and the drive ratio is one to one.

Thus the impeller vanes 61 of gear 12 pump the fluid against turbine vanes 63 (FIG. 3) of gear 16, and this fluid is then directed by the latter against adjacent stationary guide vanes 65. Guide vanes 65 in turn direct the fluid into the path of impeller vanes 61A of the member 17 which then pump the fluid against turbine vanes 63A. The fluid then travels into engagement with the next guide vanes 65A which direct it into impeller vanes 99 of the member 21. Vanes 99 provide additional force to the fluid in its circulating travel.

The fluid is then returned by way of the inner vanes 100, guide vanes 66A, vanes 64A and 62A, guide vanes 66, and vanes 64 and 62, the apertures 29A in the walls 68A between guide vanes 65A and 66A and the apertures 29 in the walls 68 between guide vanes 65 and 66, permitting equalization of fluid pressure.

The transmission has a hydraulic overdrive function which operates automatically to allow increase in the velocity of the output shaft at certain speed and load conditions. Referring to FIGS. 1 and 3, it will be seen that in rotative operation of the gear carrier 26 and gears 30 and 43 fluid will be directed in the outer and inner fluid channels in the direction of the arrow Y in FIG. 1. That is, in the outer channel, fluid is directed from right to left and in the inner channel in an opposite direction. The impeller vanes 107 pump fluid against the reaction vanes 105 which change the direction of the fluid and direct it against turbine vanes 103 of the gear 30 to provide a buffing or resistance to the rotation of said gear 30. The fluid returns through the inner channel, the guide vanes 101 and 102 providing assistance to the feed back of the liquid.

This hydraulic buffing action on the gear 30 causes a resistance to the rotation thereof and when the load resistance is less than the resistance necessary to require the full torque as occurs generally after a medium output speed is reached, then such hydraulic buffing or resistance causes the gear 30 to lag. When gear 30 lags behind gear 43 the reverse torque therefrom is of course removed and the cam ring 40 of reversing clutch 41 releases from cam surface 39 to allow gear 30 to stop under the buffing action of the fluid from the impeller vanes 107. As gear 30 reduces in speed or stops altogether the gear 43 is rotated at a higher velocity by reason of its gear ratio with pinions 15B. Reverse rotation of gear 30 is prevented in its stopped position by a brake 83. The brake 83 is similar in structure to brakes 80 and 81 previously described having peripherally splined clutch discs engaging splines of gear 30 and having peripherally splined clutch discs engaging splines in the flange of a member 75. Gear 30 has a cam face 53 which is similar in structure to the cam face 51 of gears 16 and 20 and this cam face is operable with a cam ring 54 similar to the cam ring 52 to prevent reverse rotation of the gear 30. The member 75 is splined to the housing 1 and has peripheral directional vanes 101 and 102.

Such overdrive mechanism will operate automatically with the attainment of certain speed and load conditions, i.e., when load resistance is less than that resistance necessary to require full torque power, generally occurring at medium speed and load conditions. There is also a drag on the engine when the torque from the output shaft exceeds the driving torque, as during deceleration or on a down grade travel of a vehicle. Such drag occurs mechanically by reason of the gear ratio between pinions 15B and gears 30 and 43. An hydraulic drag is also provided in that the impeller vanes on the gear 43 drive fluid against the vanes on the carrier 26 to cause a reaction whereby torque from the output shaft is fed back through the carrier 26 to the engine.

In reverse operation of the transmission the lever 49, FIG. 6, is moved to the right to cause the control ring 42 to disengage forward clutch 86 and cause engagement of reversing clutch 41. Also, by such movement of this lever, shaft 91 is pivoted in the direction of the arrows in FIG. 7 to separate cam elements 94 anad 95 and tighten the band 60 on the carrier 26. Therefore, in reverse, carrier 26 is stationary and reverse clutch 41 is engaged.

The structure of FIG. 9 illustrates a modified form of the invention. In this modification there is provided a housing or reservoir 130 having an end plate 131 removably secured thereby by screws 132. An input shaft 134 has a splined connection 135 with a gear carrier 136 on which is pivotally mounted, by radial stub shafts 137, pinion gears 138, the shafts 137 being retained in position by pins 139.

A splined bushing 142 is mounted on the shaft for rotation therewith and supported on such bushing is a first bevel gear 143 having a beveled tooth portion 144 in mesh with pinions 138. A second bevel gear 145 having a similar beveled tooth portion 146 meshes with pinions 138 and comprises a part of an output shaft 148.

Gear member 143 integrally carries on its periphery a plurality of outer impeller vanes 150 and inner fluid return vanes 151, and gear member 145 integrally carries outer turbine vanes 152 and inner fluid return vanes 153 respectively. The inner and outer sets of vanes are defined peripherally by annular walls 155, 155' and 156 and 156', respectively. These vanes operate in an annular chamber 157 in the housing.

The device has suitable thrust bearing means 158 and mounting bearings 159, the latter bearings being held in place by suitable retaining means 160.

In the FIG. 9 form of structure, torque from the vehicle engine is applied to the gear carrier 136, and as the load from output shaft 148 is on gear member 145, a ratio velocity drive, preferably two to one, is applied through pinions 138 to the gear member 143. This latter gear member thereby is rotated at higher velocity than the input shaft, namely twice the velocity when gear member 145 is stationary.

As the vehicle load is on gear member 145 it will be stationary at starting speed and the gear member 143 will thereby rotate at high velocity. Rotation of impeller vanes 150 with the gear member 143 imparts a pumping action on reaction vanes 152 on the second gear member 145 and power will thus be applied to the outupt. Therefore, maximum hydraulic power is applied to the output under maximum load and as the load decreases, as when the vehicle increases speed, a lesser power and a greater speed potential is applied. When the vehicle reaches a certain speed the two gear members 143 and 145 will rotate at equal velocity, the slippage between these two gear members depending of course on the speed of the vehicle and the load requirements thereof.

I claim:

1. A transmission mechanism comprising an input member having forward rotation, an output member, mechanical reduction means operatively connected to said input member, hydraulic drive means on said mechanical reduction means operative to reduce the mechanical reduction drive at selected speed and load conditions, means defining a working-fluid channel for said hydraulic drive means, first gear means adapted to be connected with said mechanical reduction means, second gear means connected to said output member, a carrier member intermediate said first and second gear means also adapted to be connected with said mechanical reduction means, pinion gears rotatably mounted on said carrier and meshing with said first and second gear means, clutch means operative to connect said carrier to said mechanical reduction means in forward drive and to connect said first gear means to said mechanical reduction means in reverse drive, and brake means operable with said clutch means and engageable with said carrier member to lock said carrier member in a non-rotative condition in reverse drive position of said clutch.

2. In a transmission mechanism, an input member having forward rotation, a carrier member secured to said input member for rotation therewith, first gear means, an output member, second gear means connected with said output member, ratio connecting means on said carrier member engageable with said first and second gear means whereby both gear means rotate in the same direction and said second gear means is adapted to operate at increased velocity upon a reduction in velocity of said first gear means, fluid drive turbine means on the peripheral edge of said first gear means, pump means on the peripheral edge of said second gear means operative to direct fluid under pressure against said turbine means to reduce the velocity of said first gear, and means defining a working-fluid channel for returning working fluid from said turbine means to said pump means.

3. In a transmission mechanism, an input member having forward rotation, a carrier member secured to said input member for rotation therewith, first gear means, an output member, second gear means connected with said output member, ratio connecting means on said carrier member engageable with said first and second gear means whereby both gear means rotate in the same direction and said second gear means is adapted to operate at increased velocity upon a reduction in velocity of said first gear means, brake means operative on said first gear means preventing greater speed of the latter relative to the second gear means, fluid drive turbine vanes on the peripheral edge of said first gear means, impeller vanes on the peripheral edge of said second gear means operative upon rotation of the latter to direct fluid under pressure against said turbine vanes to reduce the velocity of said first gear means, and means defining longitudinal working fluid channels for returning working fluid from said turbine vanes to said impeller vanes.

4. A transmission mechanism comprising an input member having forward rotation, a driven member, first gear means connected to said input member, second gear means, a first carrier member connected to said driven member, gear means on said carrier member connecting said first and second gear means for mechanical ratio drive, brake means operative with said second gear means to establish said mechanism ratio drive, hydraulic drive and driven means on the peripheral edges of said first and second gear means operative to reduce the mechanical ratio drive at selected speed and load conditions, a second carrier member, clutch means operatively connecting said second carrier member with said driven member, third gear means, an output member, fourth gear means connected with said output member, ratio connecting means on said second carrier member engageable with said third and fourth gear means whereby said latter gears rotate in the same direction and said fourth gear means is adapted to operate at increased velocity upon a reduction in velocity of said third gear means, fluid drive turbine means on the peripheral edge of said third gear means, pump means on the peripheral edge of said fourth gear means operative to direct fluid under pressure against said turbine means to reduce the velocity of said first gear means, means defining a working fluid channel for returning working fluid to said hydraulic means and said pump means, and means adapted to establish a reverse rotation of said fourth gear means and said output member.

References Cited in the file of this patent

UNITED STATES PATENTS

| | | |
|---|---|---|
| 2,131,619 | Duffield | Sept. 27, 1938 |
| 2,203,546 | Pollard | June 4, 1940 |
| 2,336,055 | Bacon | Dec. 7, 1943 |
| 2,534,104 | Chiville | Dec. 12, 1950 |
| 2,899,844 | Hattan | Aug. 18, 1959 |

FOREIGN PATENTS

| | | |
|---|---|---|
| 745,868 | France | May 17, 1933 |